Figure 3:
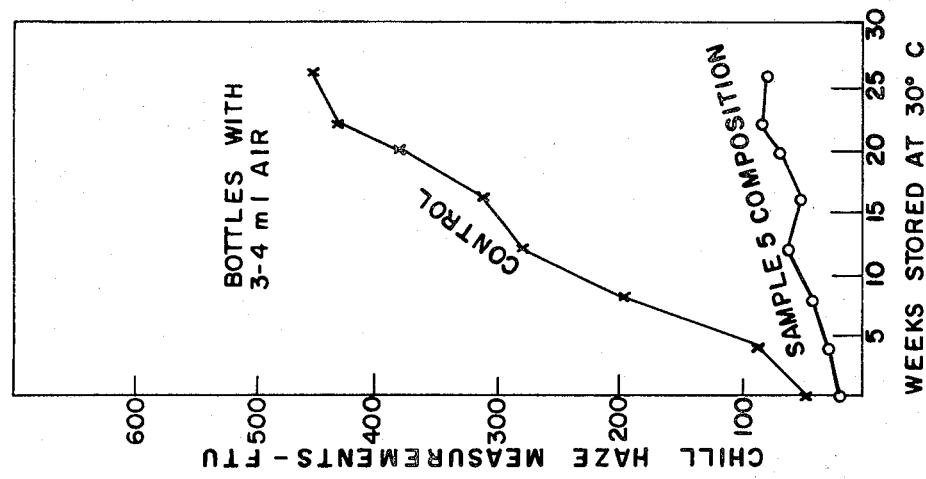

United States Patent [19]

Stone

[11] 3,770,454

[45] Nov. 6, 1973

[54] CHILLPROOFING OF FERMENTED MALT BEVERAGES

[75] Inventor: Irwin M. Stone, Staten Island, N.Y.

[73] Assignee: Baxter Laboratories, Inc., Morton Groves, Ill.

[22] Filed: Dec. 21, 1971

[21] Appl. No.: 210,512

Related U.S. Application Data

[63] Continuation-in-part of Ser. No. 139,946, May 3, 1971.

[52] U.S. Cl. ................................................. 426/12
[51] Int. Cl. ............................................. C12h 1/12
[58] Field of Search .................................. 99/48, 31

[56] References Cited
UNITED STATES PATENTS

| | | | |
|---|---|---|---|
| 3,366,483 | 1/1968 | Stone | 99/48 |
| 2,159,985 | 5/1939 | Gray et al. | 99/48 X |
| 2,892,718 | 6/1959 | Stone | 99/48 |
| 2,916,377 | 12/1959 | Shaler et al. | 99/48 X |
| 2,206,066 | 7/1940 | Wallerstein | 99/48 |

OTHER PUBLICATIONS

Wright, E. C., The Problem of Protein Haze in Bottled Beer, Wallerstein Laboratories Communications, Vol. XIX, No. 65 (pp. 127–141).

*Primary Examiner*—David M. Naff
*Attorney*—Scott J. Meyer

[57] ABSTRACT

A method and composition for chillproofing fermented malt beverages, to improve storage stability and to prevent the development of hazes and turbidities in the finished packaged beer, comprising the combined use of the growth products of certain mold microorganisms containing decomplexing enzymes for the protein-tannin complex system and at least one substance from the group consisting of the alkali metal sulfite salts and the alkali metal and alkaline earth metal ascorbate salts.

4 Claims, 3 Drawing Figures

CHILLPROOFING OF FERMENTED MALT BEVERAGES

CROSS-REFERENCE TO RELATED APPLICATION

This is a continuation-in-part of U.S. Pat. application Ser. No. 139,946, filed May 3, 1971.

This invention relates to the brewing of fermented malt beverages such as beers and ales and more particularly to the step in the brewing process known as chillproofing.

The chillproofing of fermented malt beverages (hereinafter referred to as "beer") is a necessary step in the brewing process. The beer-drinking consumer expects to receive a beverage that is sparklingly brilliant in clarity and one that will retain this clarity on long storage at low temperatures. The slightest haze appearing in the cold beer could be a cause for consumer complaint and rejection. The step in the brewing process that insures this crystal clarity under varied storage conditions and counteracts the deleterious effects of time and temperature is known as "chillproofing."

A procedure now most widely used in the industry for accomplishing the chillproofing of beer was first described in 1911 in a series of United States Patents issued to Leo Wallerstein. That procedure involved the addition of a trace of proteolytic enzyme to the cold beer contained in tanks. On further cold storage and filtration a chillproofed beverage resulted. The proteolytic enzyme most generally used for chillproofing is papain, which is obtained from the fruit of *Carica papaya*, although ficin, bromelain or other plant proteases can also be employed. The chillproofing action comprises an enzymatic breakdown of the traces of high molecular weight proteins in the beer into smaller fragments which are more soluble and less precipitatable.

Another enzymatic chillproofing process, but of a non-proteolytic nature, was recently described in U. S. Pat. No. 3,366,483. Said process utilizes a mixture of chillproofing enzymes obtained as the extract or the concentrate of the extract of the water soluble growth products of certain mold microorganisms such as *Aspergillus niger* and other mold microorganisms as described in the patent. A product containing a mixture of chillproofing enzymes can be prepared, as taught in that patent, by extracting the mold growth with water and concentrating this extract such as by evaporation. This crude extract can be used either before or after inactivating the limit dextrinase or, preferably, a purified dry product is used after precipitating said crude extract with a salt such as ammonium sulfate, dissolving the precipitate in water, adjusting the pH of the redissolved precipitate to strongly acid levels to inactivate limit dextrinase activity and evaporating the solution to dryness after readjustment to its original pH value. Said mixture of chillproofing enzymes, which can be dry or liquid, crude or purified, will be referred to hereinafter as the "enzyme complex preparation."

The specific mode of the chillproofing action of the mixture of enzymes contained in the enzyme complex preparation is not completely known. It is known, however, that the chillproofing activity is not entirely proteolytic, as the proteolytic activity in the enzyme complex preparation is not sufficient for this purpose, being much less than that of commercial proteolytic enzymatic chillproofing preparations. A large part of its action is due to its strong decomplexing action on the proteintannin complex in the beer. The appearance of a chill haze in beer is generally regarded as due to the formation of highly insoluble proteintannin combinations. The enzymes contained in the aforesaid enzyme complex preparation prevent the formation of these protein-tannin complexes and tend to decomplex any protein-tannin combinations formed before the enzyme complex preparation is added.

In the chillproofing of American type beers prepared with about 70 percent malt and 30 percent adjuncts such as corn or rice, about 15 parts per million (ppm) to 25 ppm of the enzyme complex preparation are required to produce a satisfactorily chillproofed beverage containing only the tannin bodies derived from the malt and hops. In accordance with a method of chillproofing described in co-pending U.S. Pat. application Ser. No. 139,946, filed May 3, 1971, it has been found that if these beers are given a preliminary treatment with tannic acid, a synergisim exists between said tannic acid treatment and the enzyme complex preparation such that there is an approximately ten-fold reduction in the amount of the enzyme complex preparation required to eliminate haze development and produce a highly stable beer. With a pretreatment of from about 25 to 80 ppm tannic acid, only from about 1 to 3 ppm of the enzyme complex preparation is required instead of the usual 15 to 25 ppm.

Notwithstanding the outstanding chillproofing advantages which result from the combined use of tannic acid and the enzyme complex preparation, relatively few U. S. breweries presently employ tannic acid chillproofing and there is a reluctance on the part of many of the other breweries to convert to a process which requires the use of tannic acid.

It has now been found, however, that similar synergistic chill-proofing results are obtained when the enzyme complex preparation is employed in combination with at least one substance selected from the group consisting of the alkali metal sulfite salts and the alkali metal and alkaline earth metal ascorbate salts. When the beer is treated with a total of from about 10 to about 100 ppm of one or more of these substances, only from about 1 to about 5 ppm of the enzyme complex preparation is required instead of the usual 15 to 25 ppm.

The aforementioned substances or similar such salts as are employed in this invention in combination with the enzyme complex preparation have been used heretofore for the stabilization of beer against the deleterious effects of oxygen and oxidation. Thus, U. S. Pat. No. 2,159,985 describes the treatment of beer with ascorbic acid and other ene-diol compounds while U. S. Pat. No. 2,206,066 teaches the use of alkali metal salts of hydrosulfurous acid in beer. The combined use of the ascorbates and the salts of hydrosulfurous acid is disclosed in U. S. Pat. No. 2,892,718. The use of sodium metabisulfite in beer is described in U. S. Pat. No. 3,095,358. In accordance with the present invention, at least one of these substances and preferably a mixture of a sulfite salt and an ascorbate salt is used together with the enzyme complex preparation in the beer for chillproofing effects.

The amount of the foregoing additives used in the beer in accordance with this invention will vary and will depend, in part, upon the particular beer and the specific process conditions. In general, however, it is preferred to use from about 1 to about 5 ppm of the enzyme complex preparation, from about 10 to about 25 ppm of the alkali metal sulfite salt and from about 15 to about 100 ppm of the alkali metal or alkaline earth metal ascorbate salt. An optimum combination of these beer additives is one such as supplies about 1.3 ppm of the enzyme complex preparation, about 15 ppm of the alkali metal sulfite salt and about 23.7 ppm of the alkali metal or alkaline earth metal ascorbate salt in the beer. The foregoing optimum combination can be prepared, for example, by admixing 3.3 parts (by weight) of the enzyme complex preparation with 37.4 parts (by weight) of sodium metabisulfite and 59.3 parts (by weight) of sodium ascorbate and adding the mixture to beer at a concentration of 40 ppm (equivalent to 1 pound per 100 barrels).

The order of addition or time of addition of these additives to the beer is not critical although it is preferred to incorporate the combination into the finished beer before it is placed in cold storage.

The following examples are illustrative of the present invention although the invention is not to be construed as limited thereto. Many variations of these examples can be made by those skilled in the art without departing from the spirit and scope of the invention and it is intended that all such variations are included in the claimed invention.

EXAMPLE 1

A purified enzyme complex preparation for use in accordance with the present invention is produced as follows:

A wheat bran mash is prepared from wheat bran, wheat flour and water, and is sterilized. One hundred twenty-five grams of the sterile mash, contained in a Fernbach flask, is inoculated with an actively growing culture of *Aspergillus niger*. After suitable growth for about 5 days at 30° C, the resultant bran-growth product is dried at low temperature until ready for extraction. Ten parts by weight of water is then mixed with the bran and stirred or shaken continually for a period of an hour. The liquor is expressed from the wet bran by pressing (centrifugation or filtration can also be used). The liquor thus obtained is then concentrated by low temperature vacuum evaporation to a specific gravity of approximately 12° Baume. The chill-proofing materials are precipitated from this concentrated liquor by adding and dissolving therein ammonium sulfate to give a salt concentration of about 25 percent to 33 percent by weight. This mixture is permitted to stand to allow the precipitate to form and settle. Some filter aid is added and the precipitate is centrifuged (filtration can also be used) to obtain a relatively dry cake. The cake is then redissolved in about 1.5 parts by weight of water at about 25° C and the pH is adjusted from its original value of 4.5 to 5.0 to a value of 1.8 with hydrochloric acid. The pH is held at this value for about 1 hour at this temperature and is then readjusted back to its original pH value with sodium hydroxide solution. This liquor is then refiltered and the clear filtrate is dried by low-temperature vacuum drying (spray drying or freeze drying can also be used) to give a friable powder which is retained as the enzyme complex preparation.

The enzyme complex preparation thus produced is admixed with sodium metabisulfite and sodium ascorbate in the following proportions:

| | |
|---|---|
| Enzyme complex preparation | 3.3 parts by wt. |
| Sodium metabisulfite | 37.4 parts by wt. |
| Sodium ascorbate | 59.3 parts by wt. |
| Total | 100.0 |

The mixture is then added to finished beer before placement in cold storage at a concentration of 40 ppm (equivalent to 1 pound per 100 barrels). Excellent chillproofing of the beer is obtained thereafter in extended cold storage of the beer.

EXAMPLE 2

A crude extract which can be used as the enzyme complex preparation in accordance with this invention is prepared as follows:

A mash is prepared and inoculated with *Aspergillus niger* and then extracted with water and evaporated in a manner similar to the procedure described in Example 1. The evaporation of the liquor proceeds to a specific gravity of approximately 30° Baume. This evaporate is then acidified at 25° C, to inactivate the limit dextrinase enzyme, by adding strong dilute sulfuric acid to reduce the pH from its original value of about 5 to a pH value of 1.8. After standing at this pH and temperature for 1 hour, the acidified evaporate is readjusted back to a pH of 5 to 6 with strong sodium hydroxide solution. The resulting solution is dried at low temperature by spray drying. The dry powder contains the active enzyme complex preparation which can be used in the practice of this invention in a manner similar to the purified enzyme complex preparation of Example 1.

EXAMPLE 3

In certain instances, an enzyme complex preparation is desired which contains limit dextrinase enzyme activity. Such a product is prepared by omitting the acid inactivation steps in the procedures of Examples 1 and 2. This enzyme complex preparation, in addition to chillproofing the beer, produces a low-sugar (or low-calorie) beer when added to the fermenting beer in the fermenters.

EXAMPLE 4

Storage beer containing no added chillproofing ingredients was filtered and carbonated in a pilot brewery. This filtered beer was filled in a series of 12-ounce colorless glass bottles and each bottle was sealed with a crown cap. The bottles were kept refrigerated at about 0° C until the caps were removed and solutions of the following tabulated combinations of the enzyme complex preparation and the sulfite and ascorbate salts were added. The beer bottles were thereafter foamed up by tapping each bottle and then recapped with a crown cap before the foaming beer could overflow. The air contents of the bottles were adjusted to a level of 1 to 2 ml. per bottle by the method of Gray and Stone, Oxidation in Beers II, *Journal of The Institute of Brewing*, 36:444 (1939). The bottles were then pasteurized by heating to 60° C for 12 minutes. After cooling, the bottles were placed in a 0° C water bath for about 20 hours and the developed chill haze was measured in a Radiometer Haze Meter, standardized to read in FTU (Formazin Turbidity Units, Beer 24, Methods of Analysis of the American Society of Brewing Chemists 1958). The haze readings were recorded and the beers were stored at 30° C. The bottles were removed from this warm storage at weekly intervals and cooled to 0° C for 20 hours and the chill haze measurements conducted. The results of these measurements set forth in Table I demonstrate that the interaction of the enzyme complex preparation and the sulfite and ascorbate salts permits an eight-fold reduction of the effective level of the enzyme complex preparation (or reduction to one eighth the level otherwise required without the sulfite and ascorbate salts).

air adjustment, the bottles were pasteurized at 60° C for 12 minutes. Three bottles at each air level were randomly selected and the initial chill haze determined. Example 4 cites the references to the methods employed for adjusting the air levels and measuring the TABLE I.—RESULTS OF TESTS ILLUSTRATING SYNERGISM BETWEEN THE CHILLPROOFING ENZYME COMPLEX PREPARATION AND SULFITE AND ASCORBATE SALTS

| Test bottle | Enzyme complex preparation[1] ppm | Sodium metabisulfite ppm | Sodium isoascorbate ppm | Chill haze measurements F.T.U.[2] | | Results |
|---|---|---|---|---|---|---|
| | | | | Initial | 4 weeks | |
| Beer blank | nil | nil | nil | 34 | 313 | Unstable. |
| SO$_2$ control[3] | nil | 15 | nil | 34 | 231 | Do. |
| Ascorbate control | nil | nil | 25 | 34 | 194 | Do. |
| SO$_2$ and ascorbate control | nil | 15 | 25 | 34 | 139 | Do. |
| High enzyme control | 25 | nil | nil | 34 | 45 | Very stable. |
| Low enzyme control | 3 | nil | nil | 34 | 155 | Unstable. |
| Enzyme and SO$_2$ | 3 | 15 | nil | 34 | 75 | Stable. |
| Enzyme and ascorbate | 3 | nil | 25 | 34 | 80 | Do. |
| Enzyme and ascorbate and SO$_2$ | 3 | 15 | 25 | 34 | 56 | Very stable. |

[1] Prepared as in Example 1.
[2] The higher the F.T.U. the hazier the sample. The clarity of samples reading up to about 60 are rated as brilliant, about 100 is the beginning of a noticeable haze, over about 150 the samples are hazy and rated unmarketable.
[3] SO$_2$ is provided by the sodium metabisulfite.

EXAMPLE 5

A chillproofing enzyme composition was prepared by thoroughly dry mixing 37.4 grams of powdered sodium metabisulfite, 59.3 grams of sodium isoascorbate powder and 3.3 grams of the dry enzyme complex preparation described in Example 1. This chillproofing composition is used in a pilot brewery test described below.

A half-barrel of beer is removed from a brewery fermenter and placed in the cold room (0° C) of a pilot brewery. After standing several days, it is tapped and 3 gallons of beer are placed in each of two 3-gallon bottles (glass storage tanks) equipped with a rubber stopper containing a metal tube leading to the bottom of the bottle and another shorter tube ending in the head space. Each metal tube has a short piece of rubber tubing which can be sealed with a screw clamp.

To the beer in one of the glass storage tanks was added and dissolved 20 parts per million of a commercially available double strength proteolytic enzyme chillproofing composition. This treatment supplies the beer used as the control. To the other bottle was added and dissolved 40 parts per million of the above chillproofing composition containing the enzyme complex preparation to serve as the test beer. Addition of 40 parts per million of this chillproofing composition imparts to the beer: 1.3 parts per million of the enzyme complex preparation, 15 parts per million of sodium metabisulfite (equivalent to 10 parts per million of SO$_2$), and 23.7 parts per million of sodium isoascorbate.

This beer was filtered, carbonated and bottled on a small scale using the pilot brewery equipment to conduct these operations. About 24 12-ounce bottles were thus obtained. Storage stability tests were conducted on these bottles of beer to determine the effectiveness of the two different chillproofing enzyme compositions.

The air contents of the bottles were adjusted to contain levels of: (a) less than 0.5 ml. air, (b) 1 to 2 ml. of air, and (c) 3 to 4 ml. air in the headspace. After the chill haze.

Figure 2:
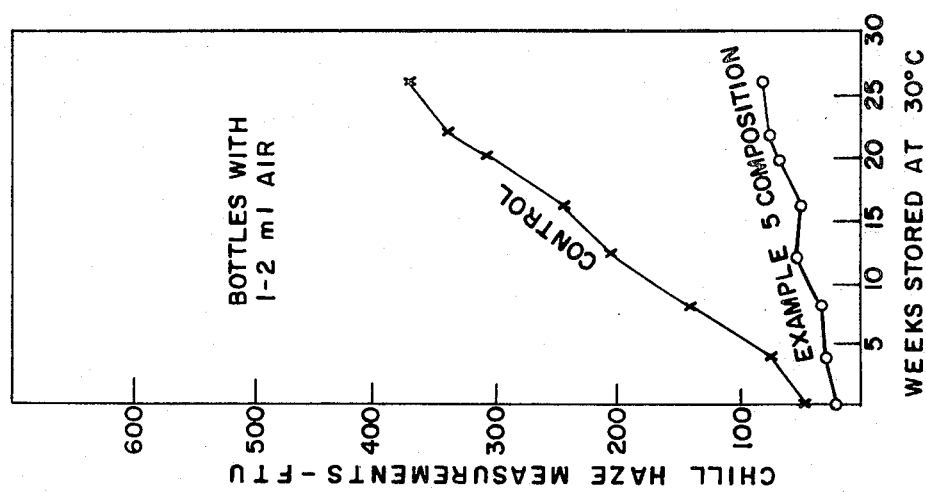
Figure 1:
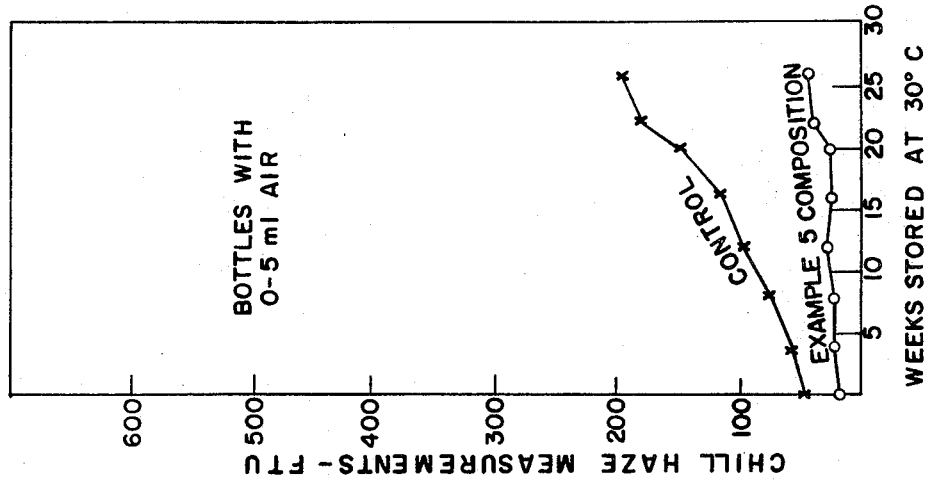

After the initial chill haze readings were made, the bottles were stored at 30° C for a week and then chill haze measurements were again conducted. The bottles were then returned to 30° C storage and chill haze measurements repeated at weekly intervals. The results of these measurements are shown in the graphs of FIGS. 1 to 3 of the accompanying drawings. These graphs show the substantially and significantly improved effectiveness of the chillproofing composition of this invention as compared to the commercially available double strength proteolytic enzyme chillproofing composition.

EXAMPLE 6

Two 200-barrel tanks in a brewery cold storage cellar were set aside for this example. Prefiltered beer from the same lot of beer was filled into each tank. During filling, one pound of a commercially available double strength proteolytic enzyme chillproofing composition was injected into one tank and two pounds of the chillproofing enzyme composition of the present invention was added to the second tank. The beer in the first tank thus served as a control test. The chillproofing enzyme composition of the present invention used in this example was the same as that described in Example 5.

After the addition of the chillproofing compositions, the beers were separately processed and given the customary storage, filtration, carbonation, bottling and pasteurization treatments. Sample cases of the finished bottles were sent to the laboratory for tests. Examination of the beers gave the following results:

TABLE II

| Test | Control Beer | Beer with Chillproofing Enzyme Composition of the Present Invention |
|---|---|---|
| Average Air Content of Bottles | 1.7 ml. | 1.7 ml. |
| Oxidation State of Beer (ITT)* | 790 Seconds | 0 Seconds |
| Sulfur Dioxide | 1 ppm | 3 ppm |
| Active Proteolytic Enzymes | positive | negative |

| | | | |
|---|---|---|---|
| Sodium Isoascorbate | nil | | 19 ppm |
| Chill Haze after Storage at 30°C | | F.T.U. | |
| 1 Week | 121 | | 84 |
| 2 Weeks | 107 | | 83 |
| 3 Weeks | 122 | | 99 |
| 4 Weeks | 130 | | 92 |

*Defined in Example 8, below.

EXAMPLE 7

The crude enzyme complex preparation produced according to the procedure of Example 2 is employed in this example. A chill-proofing composition is made up according to the following formulation:

Crude enzyme complex preparation — 37.5%
Sodium metabisulfite — 23.4%
Sodium ascorbate — 39.1%

A pilot brewery test is conducted in a manner similar to the procedure of the test described in detail in Example 5.

The control test run contains 20 ppm of a commercially available double strength proteolytic enzyme chillproofing composition while to the comparative test run was added 60 parts per million (about 1-½ pounds per 100 barrels) of the above chillproofing composition of this invention.

Examination of the finished beers gave the following results, including stability tests:

TABLE III

| Test | Control Beer | Beer with Chillproofing Enzyme Composition of the Present Invention |
|---|---|---|
| Oxidation State of Beer (ITT)* | > 15 Seconds | 0 Seconds |
| Sulfur Dioxide | 0.1 ppm | 9.6 ppm |
| Active Proteolytic Enzymes | positive | negative |
| Sodium Ascorbate | nil | 21 ppm |

*Defined in Example 8, below.

EXAMPLE 8

The formulation of the enzyme composition of Example 5 is designed for a brewery having good control of the dissolved oxygen in the beer during processing and in producing a beer with a low oxidation state as evidenced by a low Indicator Time Test (ITT) before addition of the chillproofing materials. If the brewery has poor control of these factors and the beer is highly oxidized, the sulfite and ascorbate salts used in the chillproofing enzyme composition will be destroyed before they can exert their synergistic effects with the enzyme. In cases such as this, it is necessary to increase the ratio of sulfite and ascorbate salts to the enzyme in order to compensate for this destruction.

For breweries with poor oxygen control, a formulation such as the following can be employed with good results:

Enzyme Complex Preparation of Example 1 — 2.5%
Sodium Metabisulfite — 29.0%
Sodium Ascorbate — 68.5%

The treatment level of this formulation for the chillproofing of highly oxidized beers is about 2 pounds per 100 barrels of beer (about 80 parts per million). Treatment at this level will add to the beer 2 parts per million of the enzyme complex preparation, 15 parts per million of sulfur dioxide and 55 parts per million of sodium ascorbate.

A simple test for a brewery to employ to determine whether sufficient sulfite and ascorbate salts have been used in combination with the enzyme complex preparation is to determine the indicator Time Test (ITT) value of the finished bottled pasteurized beer. The ITT should be zero. The method for conducting this test is described by Gray and Stone in the *Journal of The Institute of Brewing*, 36:253 (1939). An ITT greater than zero indicates that there has been a loss of essential reductants and greater amounts of these substances are required in order to obtain satisfactory chillproofing with the low levels of enzymes employed in the present invention.

As can be seen from the foregoing examples, use of the combination of the enzyme complex preparation and the alkali metal sulfite salts or alkali metal and alkaline earth metal ascorbate salts in the chillproofing procedure is quite flexible. Many variations can be introduced both in the quantities used and in the processing procedure.

A reciprocal relationship also exists between the amount of enzyme complex preparation, purified or crude, and the amounts of sulfite or ascorbate salts used. The more sulfite or ascorbate salt used the less of the enzyme complex preparation is required to accomplish a specific degree of chillproofing. However, the amount of sodium metabisulfite or other sulfite salt, such as sodium sulfite, which may be employed has legal and organoleptic limits; the amount of these sulfitic materials should not exceed about 25 parts per million of sulfur dioxide ($SO_2$) in the finished beer. The amount of sodium ascorbate, ascorbic acid, sodium isoascorbate, isoascorbic acid or other ascorbate salts added to the chillproofing composition can vary from about 15 parts per million to up to about 100 parts per million.

Although the microorganism *Aspergillus niger* was specifically used in the foregoing examples, it will be appreciated that related microorganisms of the *Aspergillus niger* group, for example, *A. awamori*, *A. foetidus*, *A. phoenicus*, *A. usami* and other fungal microorganisms as described in U. S. Pat. No. 3,366,483, can be employed in this invention.

Various modifications and adaptations of the foregoing examples can be devised by the person skilled in the art after reading the foregoing specification and the claims appended hereto without departing from the spirit and scope of the invention. All such modifications and adaptations are included within the scope of the invention.

What is claimed is:

1. The method of chillproofing beer comprising adding to the beer the combination of from about 1 to about 5 ppm of the enzyme complex preparation obtained as the extract of the water-soluble growth product of *Aspergillus niger* and being free of limit dextranase activity and at least one substance selected from the group consisting of from about 10 to about 25 ppm alkali metal sulfite salts and from about 15 to about 100 ppm alkali metal or alkaline earth metal ascorbate salts on a weight basis.

2. The method of claim 1 in which the enzyme complex preparation is employed together with an alkali metal metabisulfite and an alkali metal or alkaline earth metal ascorbate or isoascorbate.

3. The method of claim 2 in which the amount of the enzyme complex preparation is about 1.3 ppm, sodium metabisulfite is used in an amount of about 15 ppm and sodium ascorbate is used in an amount of about 23.7 ppm on a weight basis.

4. A chillproofed beer having therein from about 1 to about 5 ppm of the enzyme complex preparation obtained as the extract of the water-soluble growth product of *Aspergillus niger* and being free of limit dextranase activity and at least one substance selected from the group consisting of from about 10 to about 25 ppm alkali metal sulfite salts and from about 15 to about 100 ppm alkali metal or alkaline earth metal ascorbate salts.

* * * * *